United States Patent
Mazellier et al.

(10) Patent No.: US 10,014,150 B2
(45) Date of Patent: Jul. 3, 2018

(54) X-RAY GENERATOR WITH A BUILT-IN FLOW SENSOR

(71) Applicants: THALES, Courbevoie (FR); COMMISSARIAT A L'ENERGIE ATOMIQUE ET AUX ENERGIES ALTERNATIVES, Paris (FR)

(72) Inventors: Jean-Paul Mazellier, Palaiseau (FR); Colin Delfaure, Gif-sur-Yvette (FR); Pascal Ponard, Thonon-les-Bains (FR); Samuel Saada, Bourg la Reine (FR); Nicolas Tranchant, Gif-sur-Yvette (FR)

(73) Assignees: THALES, Courbevoie (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 185 days.

(21) Appl. No.: 15/031,221

(22) PCT Filed: Oct. 23, 2014

(86) PCT No.: PCT/EP2014/072795
§ 371 (c)(1),
(2) Date: Apr. 21, 2016

(87) PCT Pub. No.: WO2015/059250
PCT Pub. Date: Apr. 30, 2015

(65) Prior Publication Data
US 2016/0240343 A1    Aug. 18, 2016

(30) Foreign Application Priority Data

Oct. 25, 2013 (FR) ...................... 13 02470

(51) Int. Cl.
*H01J 35/00* (2006.01)
*H01J 35/18* (2006.01)
(Continued)

(52) U.S. Cl.
CPC ............... *H01J 35/18* (2013.01); *G01T 1/26* (2013.01); *H01J 35/065* (2013.01); *H01J 2235/18* (2013.01); *H05G 1/26* (2013.01)

(58) Field of Classification Search
CPC ........................... H01J 2235/18; H01J 35/18
See application file for complete search history.

(56) References Cited

U.S. PATENT DOCUMENTS 5,717,214 A * 2/1998 Kitamura .................. G01T 1/26
                                                                250/336.1
6,850,598 B1    2/2005 Fryda et al.

FOREIGN PATENT DOCUMENTS

JP    H08-297166 A    11/1996
JP    2001-274371 A   10/2001
(Continued)

*Primary Examiner* — Dani Fox
(74) *Attorney, Agent, or Firm* — Baker & Hostetler LLP (57) ABSTRACT

An x-ray generator tube comprises a vacuum chamber with a cathode and an anode, the cathode and anode placed in the vacuum chamber, the cathode emits an electron beam in the direction of the anode, the anode includes a target emitting x-rays when it is struck by the electron beam, and the x-rays propagate out of the vacuum chamber by passing through the wall of the chamber via a diamond-based transmission window. According to the invention, a diamond-based x-ray sensor is integrated into the diamond-based transmission window.

15 Claims, 5 Drawing Sheets

(51) Int. Cl.
*G01T 1/26* (2006.01)
*H01J 35/06* (2006.01)
*H05G 1/26* (2006.01)

(56) References Cited

FOREIGN PATENT DOCUMENTS

| | | |
|---|---|---|
| JP | 2004-095196 A | 3/2004 |
| JP | 2009-205992 A | 9/2009 |
| JP | 2013-160637 A | 8/2013 |
| WO | 00/65825 A1 | 11/2000 |
| WO | 2004/026007 A2 | 3/2004 |

\* cited by examiner

X-RAY GENERATOR WITH A BUILT-IN FLOW SENSOR

CROSS-REFERENCE TO RELATED APPLICATIONS

This application is a National Stage of International patent application PCT/EP2014/072795, filed on Oct. 23, 2014, which claims priority to foreign French patent application No. FR 1302470, filed on Oct. 25, 2013, the disclosures of which are incorporated by reference in their entirety.

FIELD OF THE INVENTION

The invention falls within the field of x-ray tubes and relates to the integration of an x-ray flux sensor into a tube.

BACKGROUND

An x-ray generator mainly comprises a vacuum chamber including at one of its ends a cathode and at the other end an anode. An electron beam issued from the cathode is accelerated in the vacuum chamber under the action of an electric field. The accelerator field may be created either by an RF electromagnetic wave, or by a static field created between two electrodes raised to very high electrical voltages (typically from 10 kV to 500 kV). The highly accelerated electron beam is made to strike a target generally consisting of a refractory material of high atomic number or indeed having characteristic fluorescence lines. The interaction between the energetic electrons and the target allows electromagnetic radiation in the x-ray range to be emitted mainly by the bremsstrahlung effect and by x-ray fluorescence. Only a few percents of the energy of the electrons are used to produce the x-rays. The rest of the energy, i.e. about 96 to 99% is dissipated in the form of heat mainly in the target. Under the electron flux, the temperature of the target may approach its melting point, the target generally being made of tungsten (3400° C.). The heat produced must be removed effectively because this effect is one of the main factors limiting the brilliance of x-ray sources. The x-rays then propagate out of the vacuum chamber by passing through a window that is transparent to the x-rays and placed on the path of the x-ray beam.

There are two families of tubes, tubes operating in reflection and those operating in transmission. In a reflection tube, the target is present in the interior of the tube. The flux of x-rays propagates towards the exterior by passing through a window that is almost transparent to the x-rays (for example made of beryllium), which window is located in the chamber of the tube. The target and the transmission window are separate. In tubes operating in transmission, the target, in this case consisting of a thin film, is juxtaposed with the transparent window. The window referred to as the transmission window then plays an important role in the removal of the heat generated in the target. In addition to having a high transparency to x-rays, the transmission window must have a maximal thermal conductivity.

Independently of the positioning of the transmission window, the flux of x-rays may be varied over time, in intensity and in energy in order to adjust imaging parameters such as contrast, penetration power or spatial resolution. The flux of x-rays is in this case varied intentionally. Specifically, an operator may modify the current and/or the acceleration voltage of the electron beam. The flux of x-rays may also vary unintentionally, especially following a fluctuation in the high-voltage supply or in the electron source. In order to use the x-ray generator tube optimally, a direct measurement of the flux of x-rays is required. In radiotherapy, for example, this makes it possible to know in real-time the radiation dose rate delivered by the tube.

Currently, transmission windows are mainly made of beryllium. Beryllium is a metal possessing a good transparency to x-rays and a thermal conductivity of about 200 W/(m·K) at room temperature which allows it to dissipate the heat given off by the x-ray tube in operation. In contrast, beryllium is an extremely carcinogenic material capable of causing serious illnesses if it is inhaled. Mention may be made by way of example of berylliosis. Moreover, since beryllium is a metal, it cannot be used in detection of x-ray flux.

With a thermal conductivity comprised between a few hundred W/(m·K) for synthetic polycrystalline diamond and 2000 W/(m·K) for single-crystal diamond, diamond possesses a thermal conductivity up to 10 times higher than that of beryllium and effectively conducts heat. Diamond of atomic number Z=6 has a transparency to x-rays neighboring that of beryllium (Z=4) and it may be implemented in the form of a UHV-tight membrane. Single-crystal diamond possesses an excellent thermal conductivity and very good x-ray detection properties. In contrast, it is not possible to synthesize an area thereof larger than a few millimeters squared. Polycrystalline diamond may easily be synthesized over larger areas. Furthermore, it possesses a thermal conductivity of 500 to 1500 W/(m·K). The thermal conductivity of polycrystalline diamond depends on a number of factors. Mention may be made, for example, of the density of grain boundaries and the grain size of the crystal structure of the diamond. Moreover, polycrystalline diamond possesses x-ray detection properties that also depend on the quality of the crystal structure of the diamond.

X-ray generators including transmission windows made of polycrystalline diamond have been around for a short while. Replacing transmission windows made of beryllium with transmission windows made of diamond makes it possible to work with higher power densities. Specifically, the high thermal conductivity of diamond makes it possible to better dissipate the heat produced by the electron spot impacting the transmission window. A better dissipation of the heat is particularly advantageous for x-ray tubes that operate in transmission, i.e. with a juxtaposition of the target function and the window function in the same structure. In the prior art, only the high thermal conductivity of diamond is exploited, in order to achieve higher powers than those of conventional tubes.

Currently, the actual flux of x-rays is measured indirectly by associating, by calibration, the x-ray dose with the measurement of the acceleration voltage of the electron beam and of the current of the x-ray tube. However, leakage currents in the x-ray generator, microbreakdowns or indeed energy filtration and absorption effects of the structure of the tube are sources of error because they are integrated into the determination of the flux whereas they do not generate a useful flux of x-rays.

To mitigate this difficulty, a flux of x-rays emitted by an x-ray generator tube may be detected using a sensor, also referred to as a dosimeter. The flux sensor measures the incident flux of x-rays. The flux sensor is placed a few centimeters to a few meters from the tube in the direction followed by the x-ray beam.

SUMMARY OF THE INVENTION

The invention aims to integrate into the tube a functionalized window by providing a sensor of x-ray flux in a diamond-based transmission window.

To this end, the subject of the invention is an x-ray generator tube comprising a vacuum chamber with a cathode and an anode, said cathode and anode being placed in the vacuum chamber, the cathode emitting an electron beam in the direction of the anode, the anode including a target emitting x-rays when it is struck by the electron beam. The x-rays propagate out of the vacuum chamber by passing through the wall of the chamber via a transmission window made of diamond, characterized in that a diamond-based x-ray sensor is integrated into the transmission window made of diamond.

To produce an in-line x-ray flux sensor, diamond may be used by way of active layer because it possesses semiconductor properties. Unlike a remote detector in which the active layer must absorb almost all the incident flux of x-rays, an integrated x-ray flux sensor must absorb only a small fraction of the x-ray flux in order not to disrupt the use of the tube and to deliver a signal proportional to the flux of photons. In this way, a continuous in-line measurement of the flux of x-rays is achieved without disrupting the useful flux of the tube. Diamond may be used for the integration of an in-line x-ray flux sensor because it has a very good transparency to x-rays. The addition of a remote diamond-based flux detector may be advantageous to measure the flux of x-rays actually produced in line. This combination however requires two independent diamond substrates to be used. The co-integration of a flux detector into a diamond-based transmission window will allow the use of material to be decreased and the integration level to be increased.

BRIEF DESCRIPTION OF THE DRAWINGS

The invention will be better understood and other advantages will become apparent on reading the detailed description of one embodiment given by way of example, which description is illustrated by the appended drawings in which.

For the sake of clarity, the same elements have been given the same references in the various figures.

DETAILED DESCRIPTION

Figures 1A, 1B, 2:
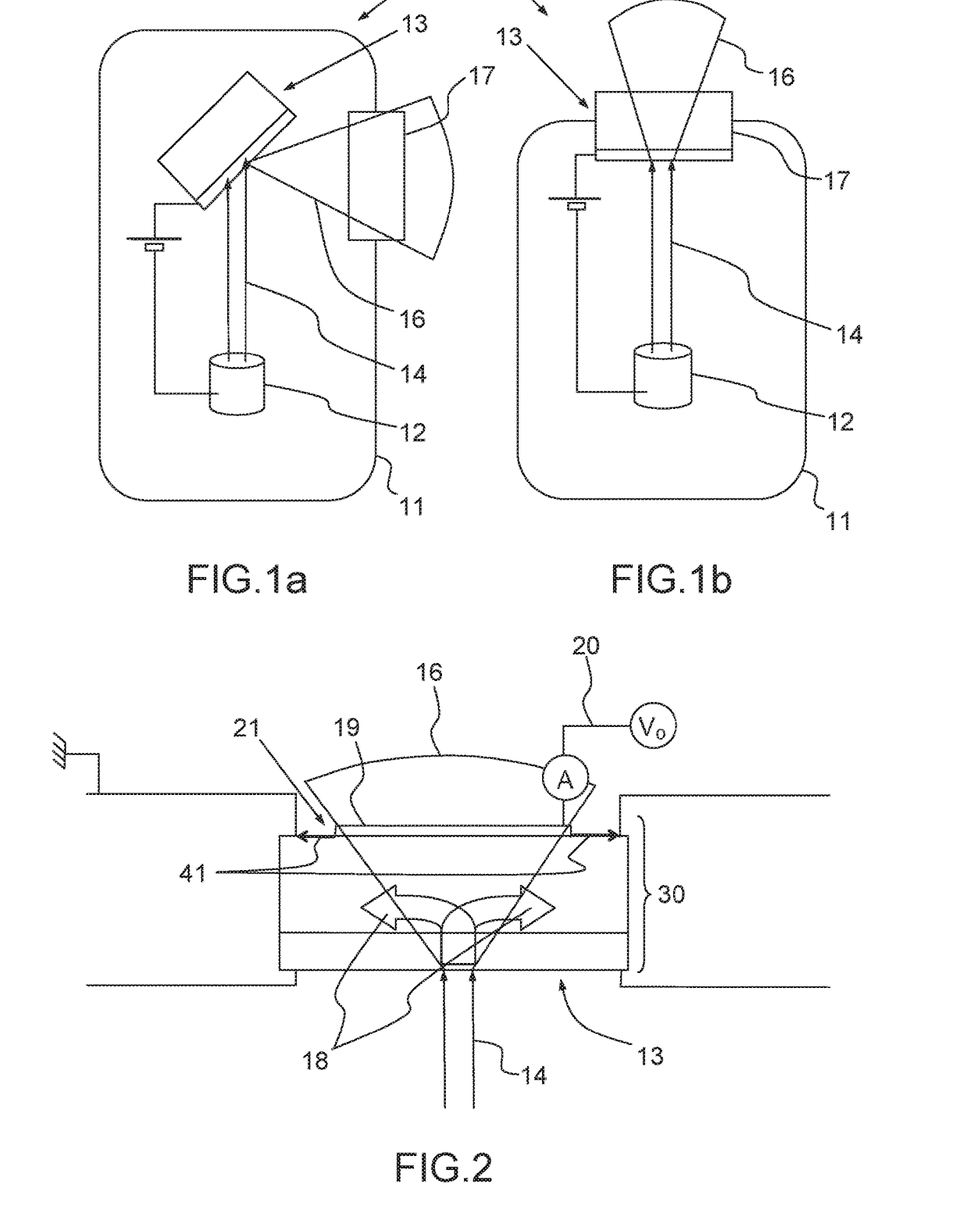
FIGS. 1a and 1b schematically show a reflection x-ray tube and a transmission x-ray tube, respectively.
FIG. 2 illustrates a diamond-based transmission window of a tube operating in transmission with the heat removal function and the x-ray sensor function.

Generally, and as schematically shown in FIGS. 1a and 1b, an x-ray generator tube 10 comprises a vacuum chamber 11 with a cathode 12 and an anode 13, said cathode and anode being placed in the vacuum chamber 11. The cathode 12 emits an electron beam 14 in the direction of the anode 13 which behaves as a target emitting x-rays 16 when it is subjected to the electron beam 14. In other words, the target is the anode 13. The x-rays 16 propagate out of the vacuum chamber 11 by passing through the wall of the chamber 11 via a transparent window 17. The window 17 must have a high transparency to x-rays. In FIG. 1a the target 13 is away from the transmission window 17. The x-ray generator tube 10 is said to have a reflection structure. In FIG. 1b, the target 13 is juxtaposed with the transmission window 17. The x-ray generator tube 10 is said to have a transmission structure. When the electron beam 16 strikes the target 13, a large portion of the energy issued from the electron beam 16 is dissipated in the form of heat in the target 13. The heat must be effectively removed to prevent any deterioration of the x-ray generator tube 10. For a transmission structure, since the target 13 is juxtaposed with the transmission window 17, the transmission window 17 plays an important role in the removal of the heat generated in the target 13. In addition to a high transparency to x-rays, the transmission window 17 must have a very good thermal conductivity.

FIG. 2 illustrates the diamond-based transmission window 30 functionalized with a heat removal function (represented by the arrow 18) and an x-ray 16 sensor function. A deposit of tungsten or another metal able to form the target 13 is produced on the diamond window 30. The diamond thickness must be sufficient to allow the window to withstand the pressure difference between the vacuum of the vacuum chamber 11 and the exterior pressure of about 1 bar. For example, for a window made of diamond possessing a Young's modulus of 1000 GPa and a diameter of 8 mm, a thickness of 100 µm is suitable for resisting a pressure difference of 1 bar. Thus, in addition to the detection and thermal functions, the transmission window also has a mechanical function.

The transmission window 30 comprises an additional diamond layer. The additional layer plays the role of x-ray sensor 21. It will be understood that the sensor 21 may be implemented both for a target operating in reflection as shown in FIG. 1a and for a target operating in transmission as shown in FIG. 1b. The body of the diamond forming the sensor 21 is not doped, i.e. it has intrinsic semiconductor properties.

An electrode 19 is produced for the sensor 21 on the transmission window 30. The electrode 19 may for example be composed of metal layers. The electrode 19 may also be composed of doped-diamond layers. In other words, the electrode 19 is a semiconductor or a metal. To integrate the window 30 into the x-ray generator tube 10, the former is soldered or adhesively bonded to the latter.

In operation, an electron beam 14 strikes the target 13 and generates a flux of x-rays 16 and heat. The heat is transferred to the body of the x-ray generator tube 10 by thermal conduction through the transmission window 30 made of diamond. The thermal conductivity of the material of the window 30 plays a fundamental role in the removal of the heat.

A voltage 20 is applied to the electrode 19 of the sensor 21. The current generated by the flux of x-rays 16 in the intrinsic diamond of the sensor 21 is collected by the electrodes 19. The electric current is proportional to the emitted flux. A calibration table (not shown in the figure) makes it possible to know in real-time the flux of x-rays 16 generated by the x-ray generator tube 10.

As detailed above, diamond possesses a low absorption factor with respect to x-ray flux and may allow flux to be measured in line. This low absorption factor with respect to x-ray flux results in a weaker response (a lower current) to a dose of x-rays compared to other semiconductor materials such as silicon. Moreover, a diamond of good crystal quality exhibits a low noise level. Thus, the signal to noise ratio is favorable and allows a precise measurement of the x-ray flux while ensuring a minimum loss of useful flux.

Figure 3:
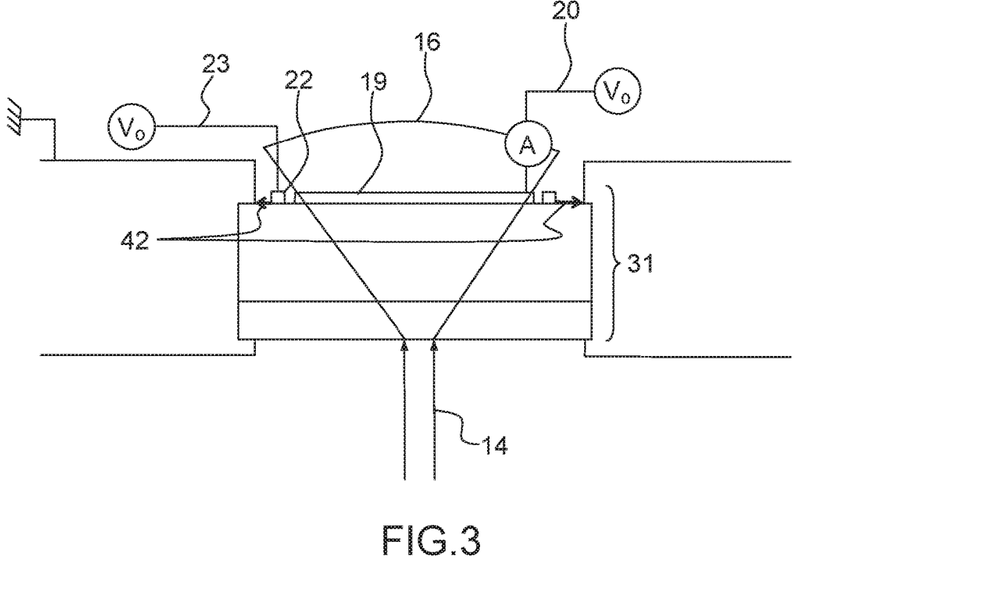
FIG. 3 shows one variant of the x-ray sensor with a guard ring.

FIG. 3 shows the functionalized diamond-based transmission window 31 with a variant of the x-ray sensor with a conductive guard ring 22 surrounding the sensor and connected to an electrical voltage source. The conductive guard ring 22 is rectangular in shape, but it may be any other polygonal shape. The conductive guard ring 22 is a ring that surrounds the electrode 19.

Without the conductive guard ring 22, the electrode 19 is biased to V0 whereas the generator tube 10 is grounded. In the absence of x-ray flux, a current may exist on the surface of the diamond, which passes from the electrode 19 to the body of the tube 10 because of a potential difference on the surface of the diamond. This is what is called a leakage current. In FIG. 2, it is represented by the arrows 41. In order to limit the undesirable effect of the potential difference, the electrode 19 is biased to the potential V0 and a conductive guard ring 22 is provided, which is also biased to V0. There is therefore no potential difference on the surface of the diamond between the electrode 19 and the ring 22 and therefore no parasitic current between the electrode 19 and the ring 22. In contrast, a parasitic current may still be present between the electrode 19 and the body of the tube 10. This is why the electrode 19 and the conductive guard ring 22 are biased independently. The current of the electrode 19 is measured, and by virtue of the presence of the conductive guard ring 22, the surface currents, which are also referred to as leakage currents, 42 exist only between the conductive guard ring 22 and the body of the tube 10 and therefore, they do not affect the measured current.

Figure 4:
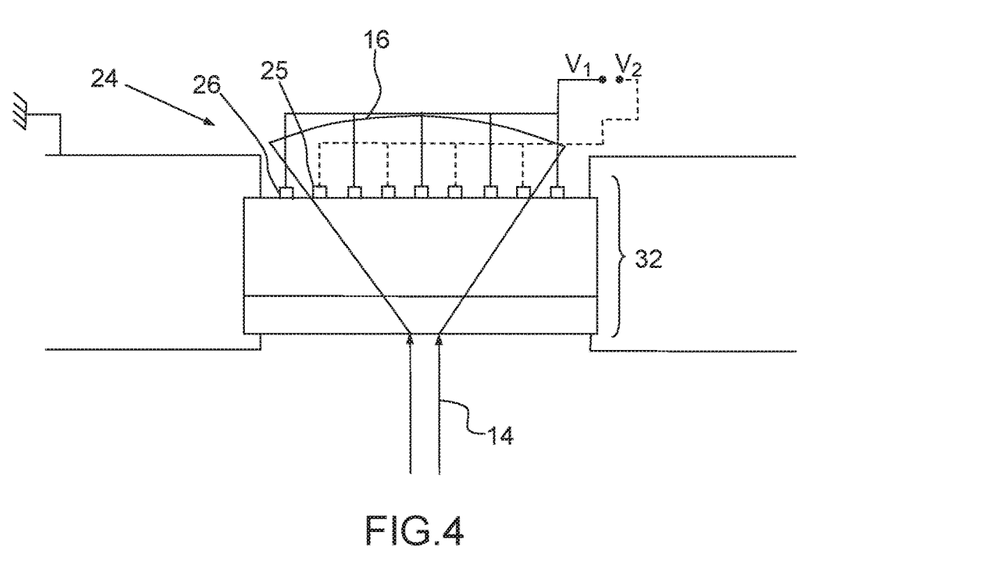
FIG. 4 shows one variant of the x-ray sensor with a surface-mounted current detector.

FIG. 4 shows the functionalized diamond-based transmission window 32 with a variant of the x-ray 16 sensor 21 with a surface-mounted current detector 24. Two electrodes 25 and 26 are produced for the sensor 21 on the transmission window 17. As for the electrode 19, the electrodes 25 and 26 may be composed of metal layers or of layers of doped diamond. The electrodes 25 and 26 are conventionally arranged with an interleaved geometry. It will be assumed that the surface currents mentioned for the configuration with a conductive guard ring are negligible relative to the current to be measured in the diamond. The electrodes 25 and 26 allow a current generated in a zone close to the surface of the sensor 21 to be measured and undesired parasitic currents to be eliminated.

Generally, to collect a current, a separator electric field is applied. For example, applying a potential difference between two electrodes creates an electric field that directs charges photogenerated in the diamond. The two electrodes allow the resulting current to be picked up, in order to perform the measurement of x-ray flux. The two electrodes 25 and 26 apply the field but on the surface of the sensor. Thus, the interelectrode distance is small, of about a few microns. The voltages to be applied are smaller and the distance travelled by the photogenerated charges is minimized. The charges are therefore better collected. Moreover, the collection volume is smaller, so the number of charges collected is smaller but the surface temperature of the sensor 21 is also lower than in the bulk and thermal noise is therefore greatly reduced. The signal to noise ratio is therefore favorable.

It is possible for the flux of x-rays to be nonuniform, either unintentionally, or in a controlled way by structuring from the start the electron beam 14. It is therefore desirable to be able to measure spatially an x-ray flux distribution. The structuring of the flux of x-rays makes image reconstruction for x-ray analysis possible. The structuring of the target enables applications such as tomography.

Figure 5:
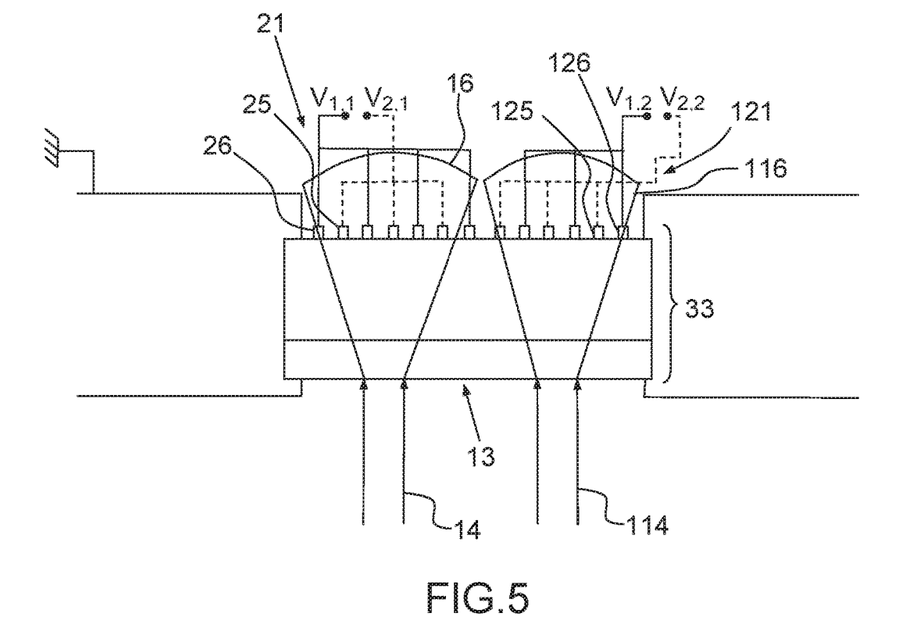
FIG. 5 shows one variant of the transmission window for multifocal/multisource tubes where a plurality of x-ray sensors are integrated into the window and placed facing a plurality of electron sources.

FIG. 5 shows a variant of the functionalized diamond-based transmission window 33 in which a plurality of x-ray sensors are integrated into the window 33. In FIG. 5, two sensors 21 and 121 are shown. It is also possible to produce a window into which more than two sensors are integrated. Two electron beams 14 and 114 strike the target 13. The target 13 emits two flux of x-rays 16 and 116. Two sets of surface-mounted electrodes 25, 26 and 125, 126 are produced on the transmission window 33. The sensor is said to be matrix-arrayed. In fact, a plurality of sensors are integrated into the transmission window 33. The presence of a plurality of sensors makes spatial and temporal resolution possible in the presence of a plurality of electron beams or of a single nonuniform electron beam.

Figure 6:
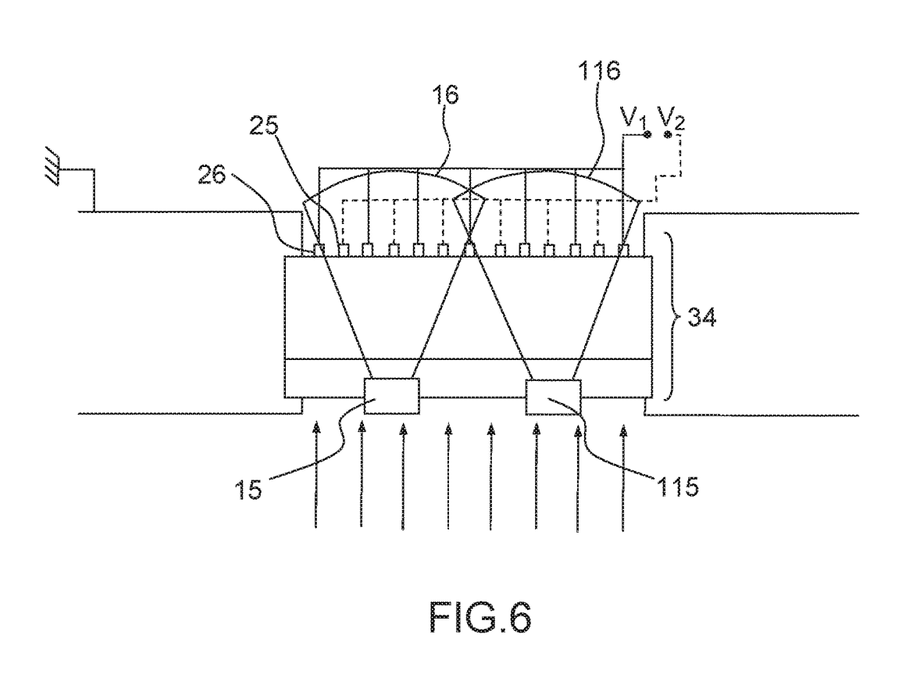
FIG. 6 shows one variant of the transmission window in which a plurality of targets are juxtaposed with the window.

FIG. 6 shows a variant of the functionalized diamond-based transmission window 34 in which two targets 15 and 115 are integrated. The example shows two targets, but it is entirely possible to have a plurality of others thereof. One electron beam per target or one single electron beam distributed over all the target strikes the targets 15 and 115. The two targets 15 and 115 each emit a flux of x-rays, 16 and 116, respectively. A set of electrodes 25, 26 measures the current generated. The target is said to have been discretized or structured in order to structure the flux of x-rays.

The x-ray generator tube such as described in the invention thus allows a direct, in-line measurement of a flux of x-rays to be obtained. In addition, it is possible to obtain information on the spatial distribution of the flux.

Currently, transmission windows are mainly made of beryllium. Beryllium is a metal with a good transparency to x-rays and possesses a thermal conductivity of 200 W/(m·K). Little by little, transmission windows made of diamond are appearing. The transmission window such as used in the invention may either be made of single-crystal diamond in the case of a window of small size, or of polycrystalline diamond. Lastly, the transmission window of the x-ray generator tube according to the invention may be made of polycrystalline diamond with at least one single-crystal diamond inclusion. This makes it possible to improve the measurement of the x-ray flux while preserving a large window area.

Figure 7:
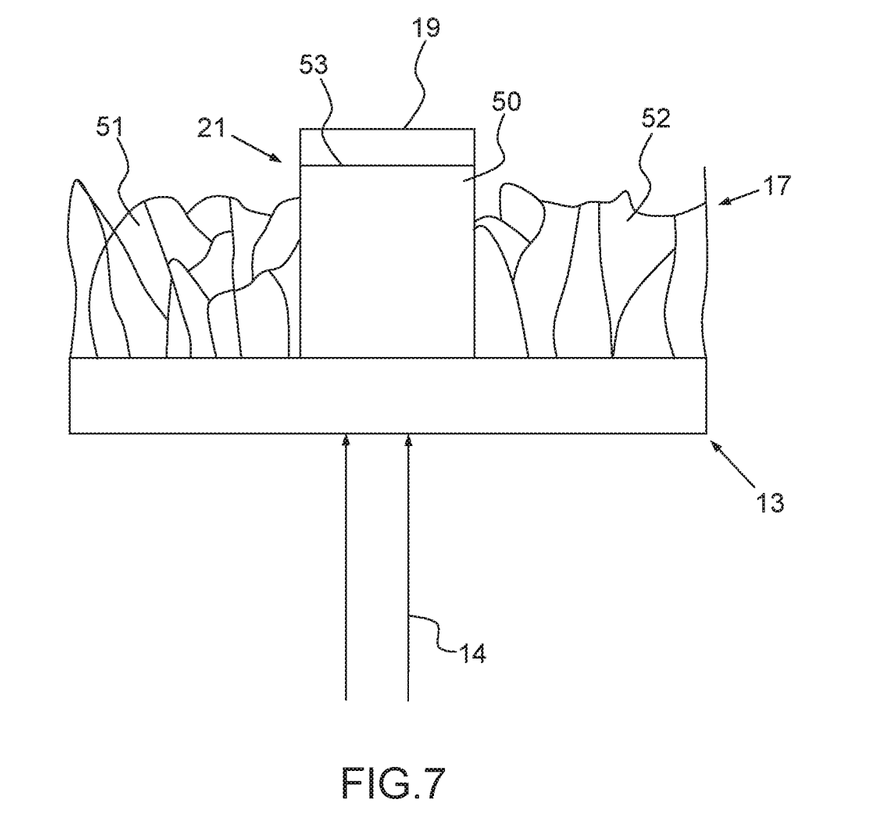
FIG. 7 shows one variant of the transmission window made of diamond.

FIG. 7 shows a transmission window made of polycrystalline and single-crystal diamond. The transmission window made of polycrystalline and single-crystal diamond is obtained by placing a single-crystal diamond 50 on a carrier that allows a film of diamond to be grown (silicon, molybdenum, etc.). A mask is deposited on a surface 53 parallel to the carrier of the single-crystal diamond and opposite the carrier. Polycrystalline diamond 51, 52 is synthesized around the single-crystal diamond. The polycrystalline diamond grows laterally and vertically. After the polycrystalline diamond has been grown, the mask on the single-crystal diamond is removed and the diamond film is freed from its carrier and a transmission window made of polycrystalline diamond with a single-crystal diamond inclusion is obtained. The transmission window may have a plurality of single-crystal diamond inclusions. Each single-crystal diamond inclusion conventionally has a square cross section but may be any other shape.

The transmission window made of polycrystalline and single-crystal diamond combines the excellent x-ray detection and thermal conductivity properties of single-crystal diamond over a small area and the good mechanical and thermal properties of polycrystalline diamond over a large area. Ideally, the transmission window is designed and positioned so that the one or more single-crystal diamond inclusions 50 are on the axes of the one or more electron beams 14. The heat generated spreads effectively in the radial direction over the few millimeters of the single-crystal diamond inclusion. The heat is then removed by the polycrystalline diamond. The thickness of polycrystalline diamond required in a transmission window made of polycrystalline diamond with single-crystal diamond inclusions to dissipate a given amount of heat is smaller relative to a transmission window solely made of polycrystalline diamond. The transmission window made of polycrystalline diamond with single-crystal diamond inclusions is robust mechanically and transparent to x-rays. The single-crystal diamond inclusions of the window may be used to produce an x-ray flux sensor 21. An electrode 19 is then produced on the sensor 21. Thus, the transmission window allows heat to be dissipated effectively, the mechanical conditions imposed by the pressure difference between the interior and exterior of the chamber to be resisted and in real-time the flux of x-rays emitted by the x-ray generator tube to be detected.

Thus, under the effect of an electric field, the cathode 12 of an x-ray generator tube 10 emits an electron beam 14 the electrons of which are accelerated in the vacuum chamber 11 of the generator tube 10 by virtue of an RF electromagnetic wave or a static field created between the anode 13 and the cathode 12. Generally, there are a number of types of cathode that generate electrons under the effect of a field. Among them, cold cathodes based on carbon nanotubes are field-effect emitters that have a certain number of potential uses, such as the emission of electrons at high frequency and switching using an optical signal. A cold cathode is capable of controlling an electron beam to achieve photo-control. Furthermore, as explained above, an x-ray generator 10 comprising an integrated flux sensor allows the dose emitted by the tube 10 to be directly measured without disrupting use thereof.

Figure 8:
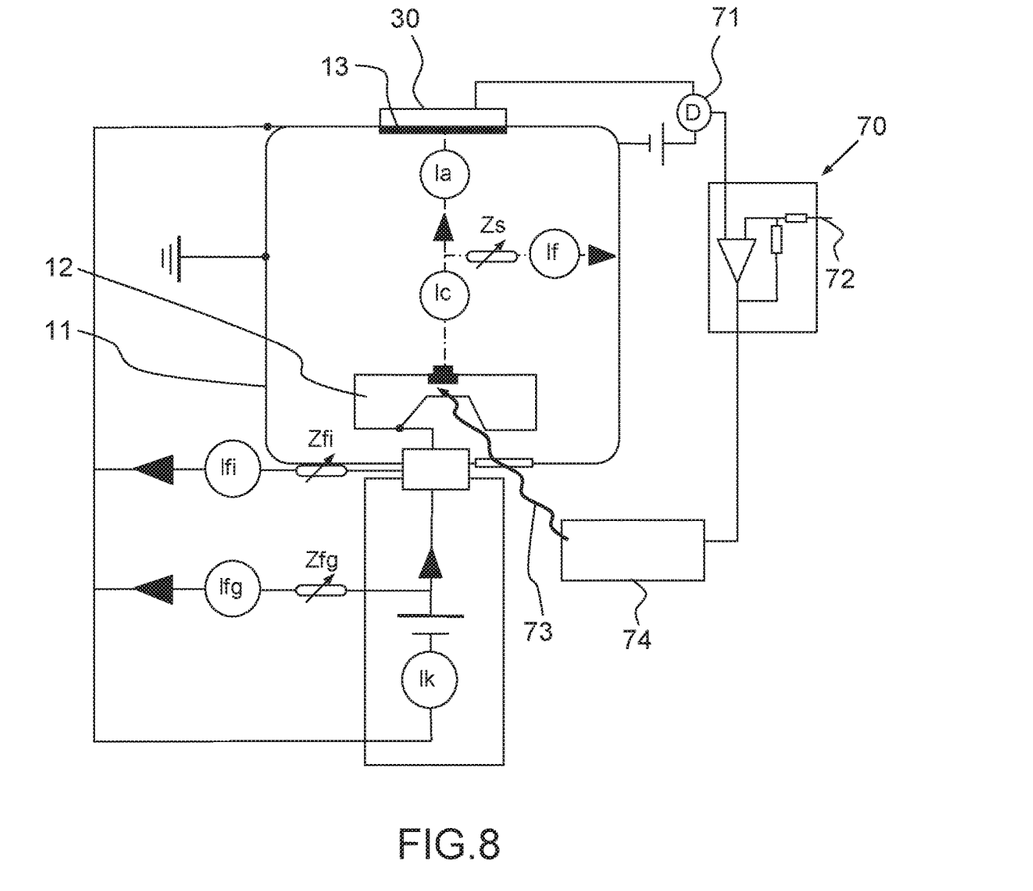
FIG. 8 shows an x-ray generator tube comprising a feedback control loop.

FIG. 8 shows an x-ray generator tube comprising a feedback control loop 70. The elements shown common to the elements in FIG. 2 are identical. In FIG. 8, the functionalized transmission window is referenced 30. It will be noted that it could equally well be a question of the transmission window 31, 32, 33 or 34 of FIGS. 3 to 6. Likewise, the transmission window may be made of single-crystal or polycrystalline diamond, or made of polycrystalline diamond with at least one single-crystal diamond inclusion, in which case the x-ray sensor may be integrated into the transmission window made of diamond on a single-crystal diamond inclusion.

Devices for controlling and feedback controlling a flux of x-rays already exist. This controlling is generally carried out either by a detector external to the source of photons, or by measuring the high-voltage current delivered by the generator to the x-ray source. These two devices have limitations with respect to precise and real-time control of the dose of x-rays.

In the case of an external detector at a distance d, the flux of the ionizing radiation varies with the square of the distance d and the spatial positioning of the detector. It is therefore necessary to characterize and calibrate this device precisely. On account of drifts throughout the system formed by the generator, the x-ray source, the geometry of the imaging system and the detector, these calibrations must be frequent especially, for example, in medical imaging or laminography applications.

Another limitation of current devices with respect to the good control of the flux of x-rays appears in the case where the object or the patient is located between the source and the detector. In this configuration, the radiation spectrum is modified, this modification being associated with the interaction of the medium passed through. The energy spectrum of the source will be modified at the exit of the object into a variable spectrum depending on the object. Since the response of the controlling detector is not linear as a function of the energy of the photons, this spectral modification will introduce a difficulty for the calibration of the system and the feedback control of the dose.

In current x-ray generators, feedback control of the dose is also limited by the high-voltage current delivered by the generator to the x-ray source. Specifically, the current received by the anode and producing the ionizing radiation is not rigorously proportional to the current setpoint of the generator. Variable leakage currents may appear either at the voltage-multiplier level in the generator, or in the high-voltage connectors, and lastly in the interior of the x-ray source.

In addition, parasitic currents may affect the precision of feedback control using the current Ik of the generator as input. There may be a leakage current Ifg at the voltage-multiplier level that is difficult to measure for electronic components raised to the high voltage (20 to 500 kV). There may be a leakage current Ifi at the tube/generator high-voltage connector level. Lastly, there may be a leakage current If in the interior of the x-ray source. The leakage current If in the interior of the x-ray source may fluctuate and vary over time; it is difficult to measure in real time. This current is a fraction of the electronic current produced by the cathode but intercepted before reaching the anode added to the current emitted by a field-effect at the cathodic electrodes forming the x-ray generator tube and the current corresponding to the back flow from the anode of secondary electrons generated by elastic collisions or true secondary reemission.

The x-ray generator tube 10 comprises a feedback control loop for controlling the electron beam 14 of the cathode 12, this control loop using a measurement 71 of a flux of x-rays emitted by the generator tube 10 as input. Advantageously, the cathode 12 is a carbon nanotube photocathode.

Thus, the x-ray generator tube 10 comprises a feedback control loop 70 providing direct feedback between the current received by the anode 13 producing the ionizing radiation and the element producing this anode current. This device requires an integrated flux sensor and advantageously a carbon nanotube photocathode or another, more conventional, type of electron emitter, the current of which may be varied. These two functions are integrated into the same x-ray source.

The flux sensor integrated into the anode 13 delivers a signal proportional to the actual dose generated by the x-ray source. The measurement 71 delivered by the flux sensor makes direct control of the cathode current possible, in order to maintain, by way of a setpoint 72, the anode current at a precise value whatever the variations in the leakage current.

Feedback control of the emitted current by the signal of the flux sensor makes it possible to generate a very stable x-ray dose whatever the leakage or parasitic currents of the system formed by the generator, the high-voltage connectors and the x-ray source. Any variation in the emission current is measured by the sensor of the generator, and the feedback control loop 70 makes corresponding corrections to the control signal of the cathode 12. This operating mode is particularly advantageous for the use of cathodes based on carbon nanotubes because it makes it possible to stabilize the dose delivered when the emission is pulsed at high frequency or when the cathode is photo-controlled by an optical signal 73 by way of an optical controller 74.

The invention claimed is:

1. An x-ray generator tube comprising a vacuum chamber with a cathode and an anode, said cathode and anode being placed in the vacuum chamber, the cathode emitting an electron beam in the direction of the anode, the anode including a target emitting x-rays when it is struck by the electron beam, the x-rays propagating out of the vacuum chamber by passing through the wall of the chamber via a diamond-based transmission window, wherein a diamond-based x-ray sensor is integrated into the diamond-based transmission window.

2. The x-ray generator tube as claimed in claim 1, wherein the target is away from the transmission window.

3. The x-ray generator tube as claimed in claim 1, wherein the target is juxtaposed with the transmission window.

4. The x-ray generator tube as claimed in claim 1, wherein the x-ray sensor comprises at least one electrode composed of conductive layers.

5. The x-ray generator tube as claimed in claim 1, wherein the x-ray sensor comprises at least one electrode composed of doped layers of diamond.

6. The x-ray generator tube as claimed in claim 1, wherein the x-ray sensor includes a surface-mounted current detector.

7. The x-ray generator tube as claimed in claim 1, wherein a plurality of sensors are integrated into the transmission window.

8. The x-ray generator tube as claimed in claim 1, wherein a plurality of targets are juxtaposed with the transmission window.

9. The x-ray generator tube as claimed in claim 1, wherein the x-ray sensor includes a conductive guard ring surrounding the sensor and connected to an electrical voltage source.

10. The x-ray generator tube as claimed in claim 1, wherein the transmission window is made of polycrystalline diamond.

11. The x-ray generator tube as claimed in claim 1, wherein the transmission window is made of single-crystal diamond.

12. The x-ray generator tube as claimed in claim 1, wherein the transmission window is made of polycrystalline diamond with at least one single-crystal diamond inclusion.

13. The x-ray generator tube as claimed in claim 1, wherein the x-ray sensor is integrated into the transmission window made of diamond in a single-crystal diamond inclusion.

14. The x-ray generator tube as claimed in claim 4, comprising a feedback control loop for controlling the electron beam of the cathode, this control loop using a measurement of a flux of x-rays emitted by the generator tube as input.

15. The x-ray generator tube as claimed in claim 14, wherein the cathode is a carbon nanotube photocathode.

* * * * *